United States Patent [19]

Wollen

[11] Patent Number: 5,129,599
[45] Date of Patent: Jul. 14, 1992

[54] HYBRID LIQUID-VAPOR PROPELLANT FEED SYSTEM FOR AEROSPACE VEHICLES

[75] Inventor: Mark A. Wollen, San Diego, Calif.

[73] Assignee: General Dynamics Corporation, Space Systems Division, San Diego, Calif.

[21] Appl. No.: 529,298

[22] Filed: May 25, 1990

[51] Int. Cl.⁵ .................. B64D 37/00; F17C 5/02
[52] U.S. Cl. .................. 244/135 R; 62/47.1; 62/48.2; 261/77; 60/671; 60/39.465
[58] Field of Search ............ 60/651, 671, 672, 39.465; 244/117 A, 118.5, 135 R, 163, 172; 62/7, 47.1, 48.2, 52.1; 261/77; 123/DIG. 12

[56] References Cited

U.S. PATENT DOCUMENTS

| | | | |
|---|---|---|---|
| 2,200,922 | 5/1940 | Heigis | 244/135 R |
| 2,472,622 | 6/1949 | Savard | 62/47.1 |
| 2,602,289 | 7/1952 | Anxionnaz et al. | 60/39.465 |
| 2,679,030 | 5/1954 | King et al. | 244/135 R |
| 2,682,154 | 6/1954 | Wilkinson | 62/48.2 |
| 3,191,395 | 6/1965 | Maher et al. | 62/47.1 |
| 3,733,838 | 5/1973 | Delahunty | 62/48.2 |
| 3,771,317 | 11/1973 | Nichols | 62/48.2 |
| 3,857,245 | 12/1974 | Jones | 62/7 |
| 3,928,254 | 3/1960 | Rae | 62/48.2 |
| 4,162,970 | 7/1979 | Zlokarnik | 261/77 |
| 4,276,749 | 7/1981 | Crowley | 62/48.2 |

Primary Examiner—Joseph F. Peters, Jr.
Assistant Examiner—Linda Palomar
Attorney, Agent, or Firm—John R. Duncan; Frank D. Gilliam

[57] ABSTRACT

A fuel system for horizontal takeoff and hypersonic aerospace vehicles. The fuel vapor generated in the fuel tank is mixed with the liquid fuel from the tank. The mix is compressed and supplied to the engine system as usable fuel. The compressor used for compressing the combination gas and liquid can be driven from a turbo expansion cycle using aerodynamic heating of the vehicle. Several different embodiments for mixing the fuel vapor with liquid fuel are disclosed.

7 Claims, 4 Drawing Sheets

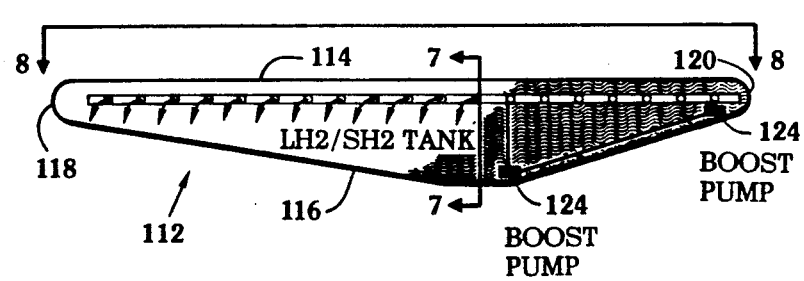
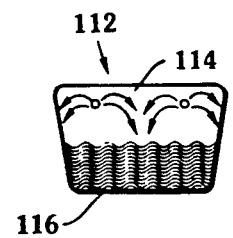
FIG. 6  FIG. 7
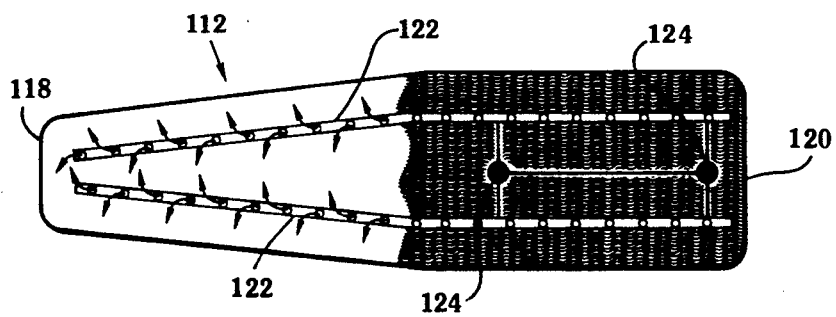
FIG. 8
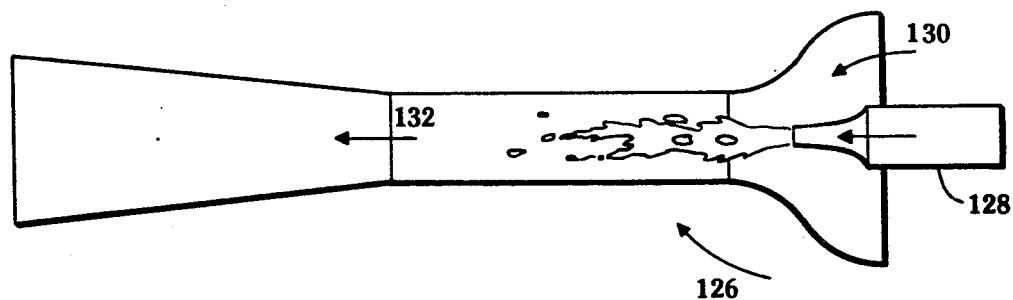
FIG. 9

HYBRID LIQUID-VAPOR PROPELLANT FEED SYSTEM FOR AEROSPACE VEHICLES

BACKGROUND OF THE INVENTION

The invention is directed to a fuel delivery system for aerospace vehicles and more particularly to fuel delivery on horizontal takeoff and hypersonic hydrogen fueled aerospace vehicles which contain slush hydrogen fuel and/or encounter significant aerodynamic heating during takeoff and flight.

FIG. 1, identified as prior art, shows a typical liquid feed fuel system. All fuel used by the engines is removed from the tank as liquid and delivered to the main turbo-machinery through a boost pump. The liquid is pumped to high pressure in the turbo-pump and used for active cooling of the engine and/or airframe as required. This heated fuel is then expanded through a turbine, to obtain shaft work required for the pump, before being burned in the combustor.

Tank pressure is normally maintained by pressurizing the ullage with recirculated hot hydrogen. Alternatively, venting of the fuel tank to the atmosphere will be required if environmental heating of the fuel produces more vapor then is required to displace liquid fuel outflow. This vaporized fuel is wasted by the venting. Maintaining the tank in a stratified state with a hot ullage is desirable to minimize heating of the liquid fuel, minimize trapped vapor residuals and increase the amount of energy extracted from the tank per unit of mass vented. However, tank pressure control is complicated by the stratified ullage. Disturbances caused by vehicle maneuvering, flight through turbulent atmosphere and changes in the lift/thrust ratio will cause cold liquid fuel to be splashed onto the hot tank walls and mixed with the hot ullage gas. Quenching of the tank wall in this manner will cause rapid vaporization of the liquid accompanied by rapid pressure rise. Mixing of liquid with the ullage will cool the ullage gas and cause fuel tank pressure to fall. These effects have been predicted and observed on cryogenic launch vehicles such as, for example, the Centaur vehicle. Mix/quench pressure excursions are tolerated on vehicles, such as the Centaur vehicle, by minimizing liquid fuel disturbances and assuring adequate structural margins to accommodate the pressure fluctuations that may occur.

There has not been a successful means or method for complete and efficient utilization of onboard fuel for aerospace vehicles, which experience significant fuel tank heating until the emergence of the instant invention.

SUMMARY OF THE INVENTION

This invention utilizes vaporized fuel, rather than wasting by venting to the atmosphere, by mixing together the vaporized fuel with the liquid fuel. This combination of mixed liquid and gas is supplied to the engine(s) rather than the liquid fuel alone.

In one embodiment, the vaporized fuel is simply compressed and mixed with compressed liquid fuel.

In another embodiment, the vaporized and liquid fuel are mixed together prior to compressing the combination.

In another embodiment, a portion of the liquid fuel is mixed with the vaporized fuel and compressed together, the remaining portion of the liquid fuel is separately compressed, combined with the compressed liquid and vapor fuel and then fed to the engine(s).

In yet another embodiment, a portion of the liquid fuel is mixed with vapor and compressed while the remainder of the liquid is compressed separately, the mixture of compressed liquid and vapor is again mixed with the separately compressed liquid, this mixture is further compressed and fed to the engines.

An object of this invention is to improve the efficiency of fuel usage in hydrogen fueled horizontal takeoff and hypersonic vehicles.

Another object of this invention is to utilize the hereto before wasted fuel vapor boiloff as engine(s) fuel.

Another object of this invention is to reduce the weight associated with the required insulation of cryogenic fuel tanks used in aerospace vehicles.

Yet another object of this invention is to maintain hydrogen fuel tanks in equilibrium eliminating the large temperature gradients and simplifying tank pressure control.

Still another object of this invention is to reduce the amount of residual liquid fuel remaining in the fuel tank.

These and other objects and advantages of the present invention will become apparent to those skilled in the art after considering the following detailed specification in which the preferred embodiment are described in conjunction with the accompanying drawing Figures.

BRIEF DESCRIPTION OF THE DRAWING FIGURES

FIG. 6 is a detailed showing of the liquid spray system in a cutaway side view of the fuel tank of the present invention;

FIG. 7 is a showing taken along line 7—7 of FIG. 6;

FIG. 8 is a showing taken along line 8—8 of FIG. 6; and

FIG. 9 is a schematic showing of the liquid fuel and $H_2$ gas mixing and diffusing tube of the fuel tank of FIG. 6.

DETAILED DESCRIPTION OF PRIOR ART

Figure 1:
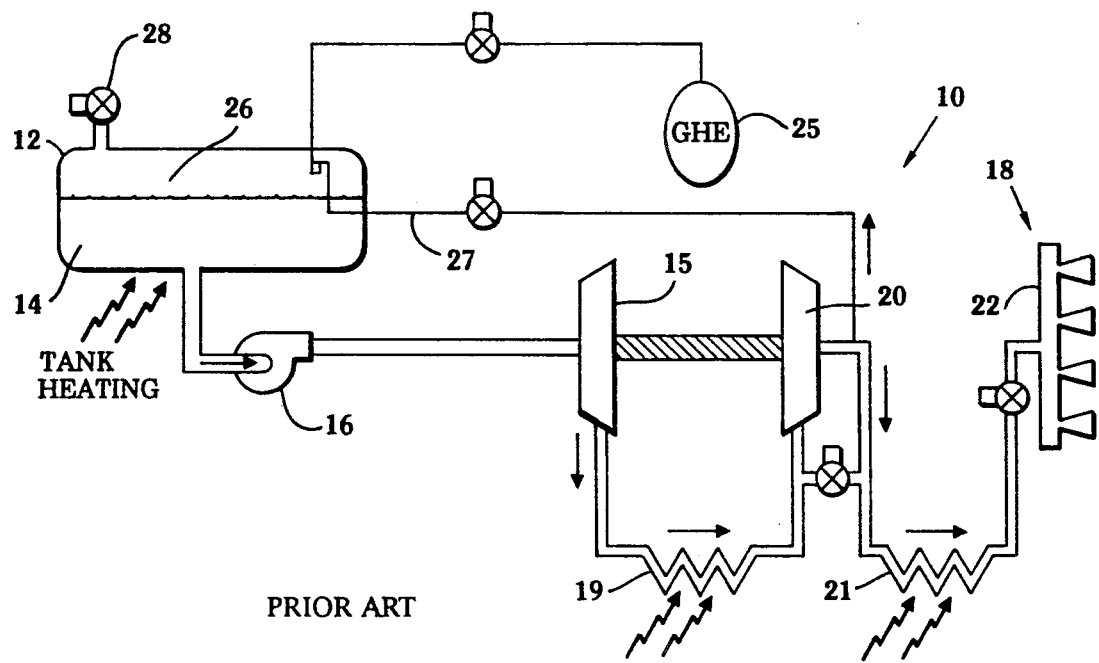
FIG. 1 is a showing of a liquid only fuel system for aerospace vehicles of the prior art.

Referring now to the various drawing Figures and specifically to FIG. 1 which depicts the prior art conventional liquid fuel only propellant fuel system 10. All fuel used by the engines is removed from the tank 12 as a liquid 14 and delivered to the main turbo-machinery through a boost pump 16. The liquid is pumped to high pressure in the turbo-pumps 15 and is used for active cooling of the airframe at location 19 as required. The heated fuel is then expanded through a turbine 20, to obtain shaft work for the pump and may be used for engine cooling at location 21 before being burned in the combustor 22. Pressure in fuel tank 12 is normally maintained by pressuring the ullage with the recirculated hot hydrogen through line 27 or from a source 25 of Helium gas. Alternatively, venting vapor 26 from the fuel (propellant) tank 12 through vent 28 will be required if environmental heating of the fuel 14 produces more vapor then is required to displace the liquid fuel outflow to the boost pump 16. Maintaining the tank in a stratified state with a hot ullage is desirable to minimize heating to the liquid, minimize trapped vapor residuals and increase the amount of energy extracted from the tank per unit of mass vented.

DETAILED DESCRIPTION OF THE PREFERRED EMBODIMENTS

Figure 2:
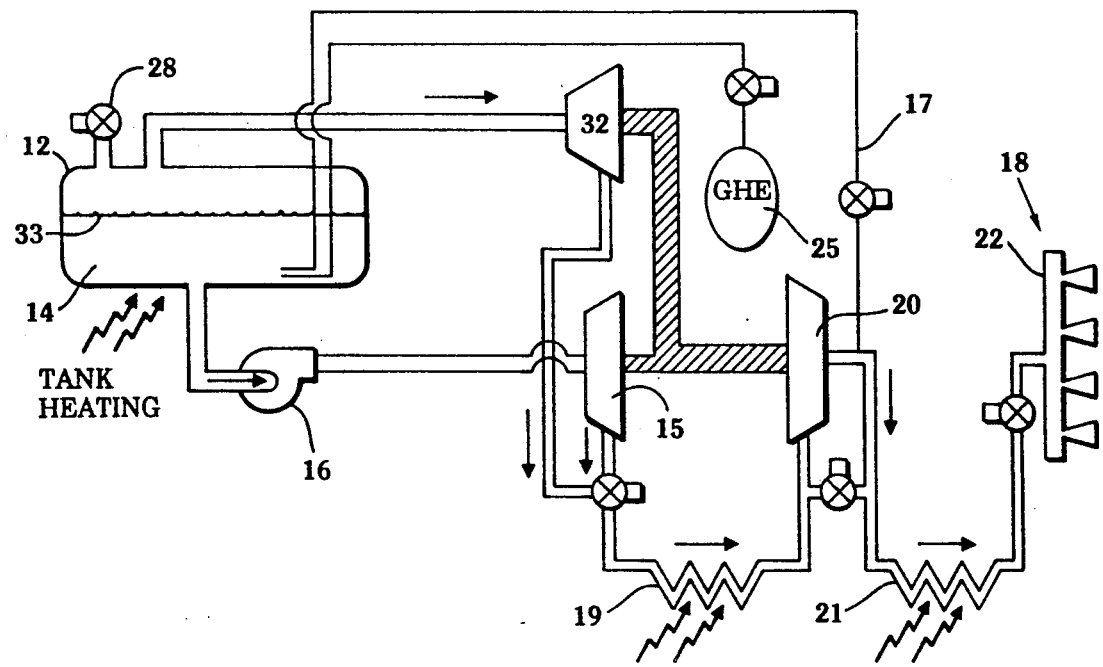
FIG. 2 is a first embodiment of the fuel system for aerospace vehicles of the invention.

Referring now specifically to drawing FIG. 2 which depicts the first embodiment of the present invention. This Figure depicts a basic hybrid feed system of the present invention where a vapor compressor 32 has been added to the showing of drawing FIG. 1 to consume boiled-off fuel. The pressure of tank 12 is maintained by operation of compressor 32 at a sufficient mass flow rate to consume all boil-off, and adding sufficient hot hydrogen gas from line 17 beneath the liquid fuel 14 surface 33 to vaporize additional hydrogen as required. The liquid fuel 14 and ullage remain in equilibrium due to the rapid boiling which occurs and due to splashing or spraying of liquid fuel onto the tank walls. The ability to use boil-off vapor 26 allows tank insulation, not shown, to be reduced, hence saving insulation weight and complexity. The ability to use fuel vapor 26 allows tank pressure and hence liquid vapor pressure, to be reduced during engine burn without loss of fuel due to venting. Maintenance of the thermodynamic equilibrium eliminates mix/quench concerns, making accurate tank pressure control possible.

Figure 3:
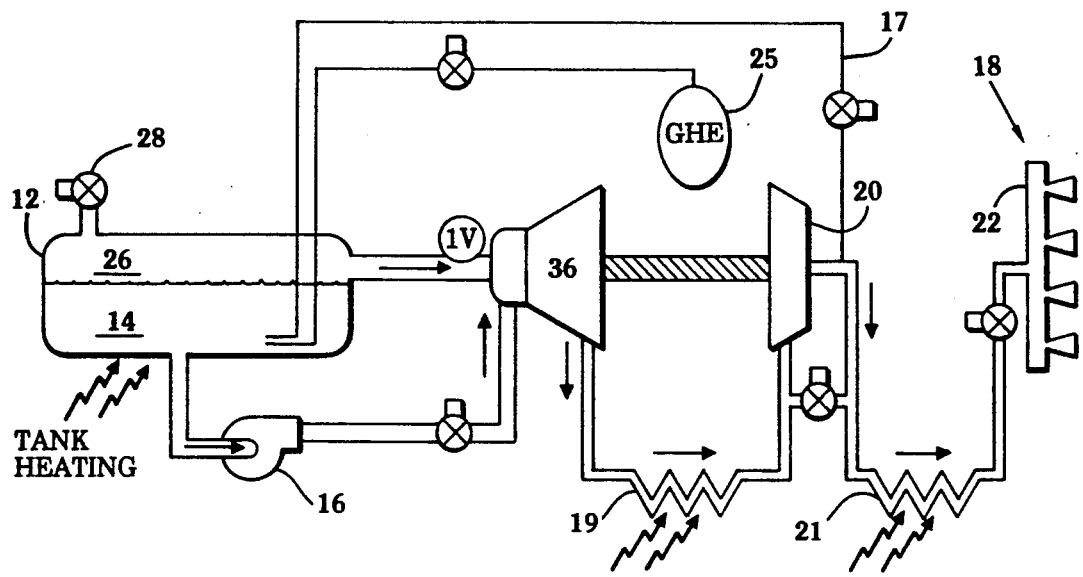
FIG. 3 is a second embodiment of the fuel system for aerospace vehicles of the invention.

Referring now to drawing FIG. 3 which depicts another embodiment of the invention. In this embodiment the turbine 15 of drawing FIG. 1 is replaced by a variable density mixed flow turbo-compressor 36. In this turbo-compressor 36 the vaporized fuel and liquid fuel from the tank are mixed prior to compression. This mixing prior to compression reduces the power required to operate the compressor due to evaporative cooling of the gas during compression.

Figure 4:
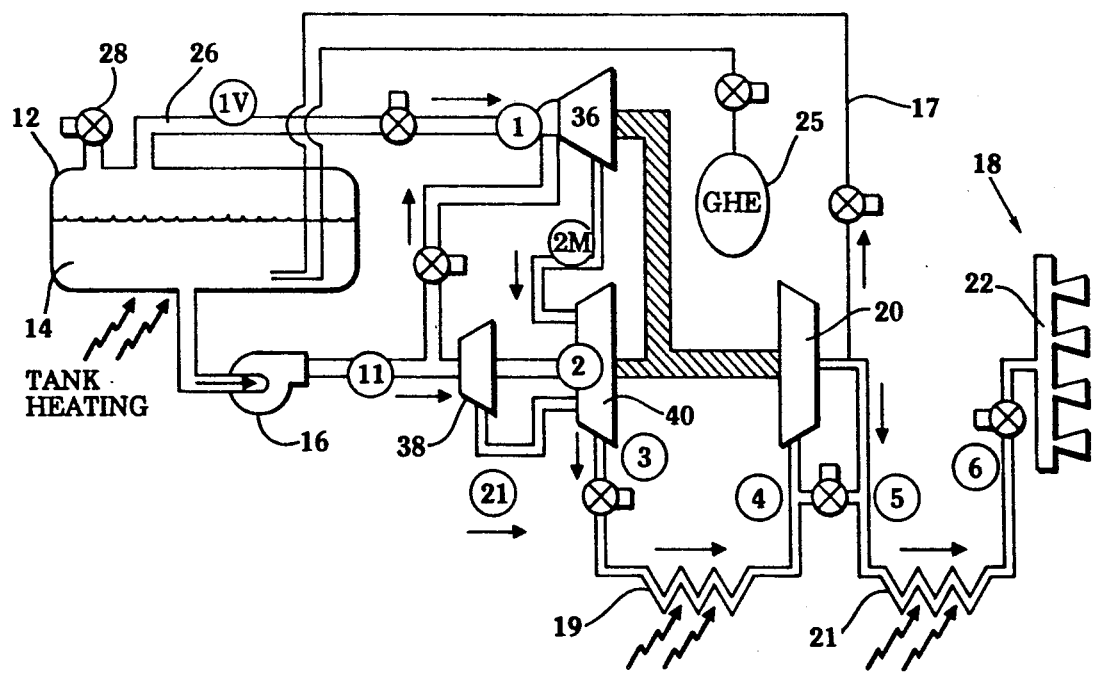
FIG. 4 is a third embodiment of the fuel system for aerospace vehicles of the invention.

Referring now to drawing FIG. 4 which depicts another embodiment of the invention. In this embodiment a specified ratio of liquid and vapor are mixed in mixed flow compressor 36 and compressed to somewhat above the critical pressure of hydrogen (186 psia). Additional required liquid fuel is pumped to a similar pressure by turbo pump 38. The super critical fluid from the two sources 36 and 38 are mixed before pumping to the final required pressure by turbo pump 40. This scheme yields similar power savings as the concept in FIG. 3, and, in addition, may be more practical in implementation.

Figure 5:
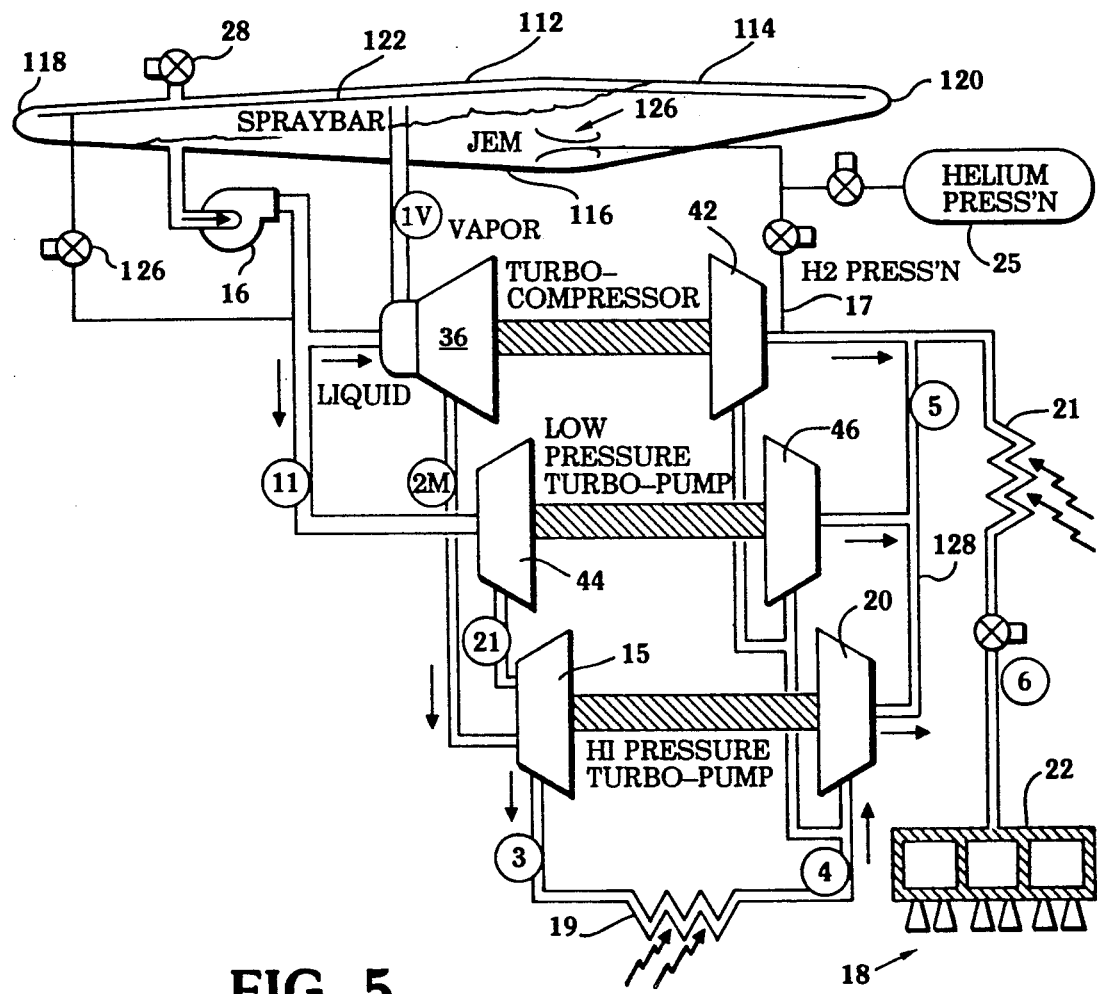
FIG. 5 is a fourth embodiment of the fuel system for aerospace vehicles of the invention.

Referring now to drawing FIG. 5 which depicts yet another embodiment of the present invention. The fuel tank 112 is configured with a sloping or angled top and bottom surface 114 and 116 respectively intermediate the ends 118 and 120 which are curvilinear. The configuration is more representative of proposed hypersonic vehicles. This Figure also shows a spray bar 122 and a jet entertainment mixing device 126 within the tank 112 to maintain the tank contents in thermodynamic equilibrium.

Referring now specifically to drawing FIGS. 6–8 which depict various cutaway views of the fuel tank 112, showing the spray bar 122 system.

The spray bar system is comprised of a pair of spray bars 122 through which liquid fuel is sprayed through holes in the spray bars, onto the tank walls. The fuel may be supplied to the spray bars by means of a pair of parallel connected booster pumps 124 or by a boost pump 126, as shown in drawing FIG. 5. The general spray pattern is shown in drawing FIG. 7. The spray system is designed to provide a liquid film on the tank walls 114, 116 thereby cooling the walls through evaporation.

The spray system will function with the least circulation if the hole pattern is chosen such that sufficient liquid is supplied to the tank walls to prevent drying of the tank walls above the liquid fuel without flooding.

Referring now to drawing FIG. 9, several mixing-/diffuser tubes 126 are employed to mix the hot $H_2$ gas into the liquid fuel. $H_2$ gas enters along arrow 128 causing liquid to be drawn in along walls above the liquid fuel without flooding. The tank of drawing arrow 130. The gas and liquid blend or mix and exit along arrow 132. Injected gas may also condense in the mixing tube, depending on liquid conditions entering at arrow 130.

Again referring to drawing FIG. 5, boost pump 16 supplies liquid fuel under pressure to the liquid inlet of turbo-compressor 36 and to low-pressure turbo pump 44. Vaporized fuel from the tank is also supplied to the turbo-compressor 36 where the liquid and gaseous sources are combined. The outputs of low-pressure turbopump 44 and the turbo compressor 36 are mixed and further compressed in the high pressure turbo pump 15. The high pressure output from high pressure turbo pump 15 is heated while providing active cooling of the engine and/or airframe 19, and then expanded through turbines 20, 46, 42 which provide the power to drive pumps and compressor 15, 44, 36. The outflow from the turbines 20, 46, 42 may then be used for additional engine cooling 21 prior to being burned in the combuster 22. A small amount of hydrogen may be bled from the turbine output through line 17 to provide tank pressurization.

Hereinabove explained are various ways to utilize the gaseous fuel formed in the fuel tank of horizontal take-off and landing space vehicles.

What is claimed is:

1. Improved fuel system comprising:
   a propellant tank in which liquid and gaseous hydrogen fuel are maintained in an unstratified, equilibrium condition;
   hydrogen fueled engine;
   a means for compressing said gaseous hydrogen fuel and using said gaseous fuel along with said liquid fuel;
   means for combining said liquid hydrogen and gaseous hydrogen external of said propellant tank for combustion in said hydrogen fueled engine; and
   a source of liquid hydrogen under greater pressure than said liquid hydrogen fuel in said tank for blending therewith.

2. The invention as defined in claim 1 wherein said gaseous fuel is compressed prior to mixing with said liquid fuel.

3. The invention as defined in claim 1 wherein said gaseous fuel is mixed with said liquid fuel prior to compressing the mixtures of said gaseous fuel and said liquid fuel.

4. The invention as defined in claim 1 wherein said tank includes spray bars to spray liquid fuel on the inner walls of said tank for cooling said tank, and maintaining said tank in thermodynamic equilibrium.

5. The invention as defined in claim 1 wherein high temperature hydrogen is blended with said liquid fuel in said tank with a convergent divergent nozzle whereby said high temperature hydrogen from source is supplied to the center of an opening in the downstream side of said nozzle by delivery means which causes liquid fuel in said tank to be drawn into said nozzle by means of venturi action wherein it is mixed with said hydrogen from said source prior to exiting the downstream end of said nozzle into said liquid fuel in said tank.

6. The invention as defined in claim 1 wherein said tank includes angled bottom and top surfaces.

7. The invention as defined in claim 1 wherein said tank has curvilinear longitudinal ends.

* * * * *